Figure 4:
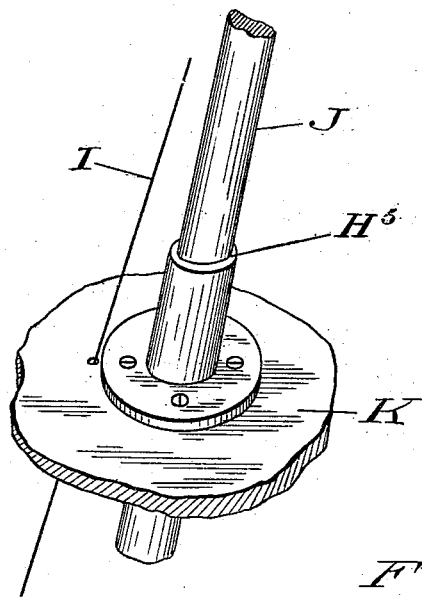

No. 618,911. Patented Feb. 7, 1899.
F. J. SHEWRING.
TROLLEY CONNECTION FOR CANAL BOATS.
(Application filed Feb. 7, 1898.)
(No Model.) 2 Sheets—Sheet 1.
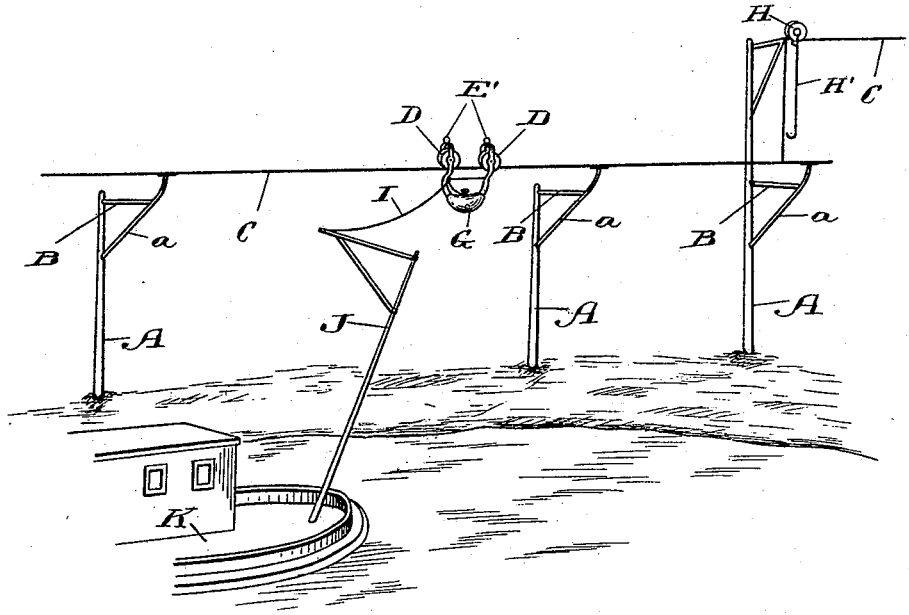
Fig. 1
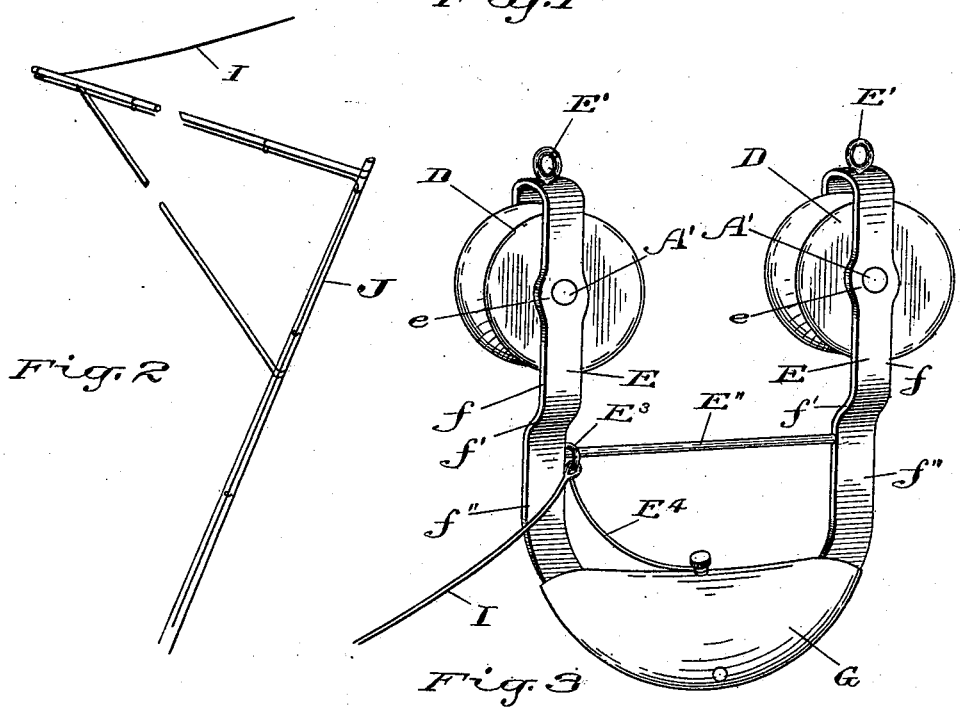
Fig. 2
Fig. 3
Witnesses
Inventor
F. J. Shewring
by C. H. Riches
his Attorney No. 618,911. Patented Feb. 7, 1899.
F. J. SHEWRING.
TROLLEY CONNECTION FOR CANAL BOATS.
(Application filed Feb. 7, 1898.)

(No Model.) 2 Sheets—Sheet 2.

Witnesses
J. E. Cameron
J. J. Riggs.

Inventor
F. J. Shewring
by C. A. Riches
his attorney

UNITED STATES PATENT OFFICE.

FREDERICK JOHN SHEWRING, OF TORONTO, CANADA.

TROLLEY CONNECTION FOR CANAL-BOATS.

SPECIFICATION forming part of Letters Patent No. 618,911, dated February 7, 1899.

Application filed February 7, 1898. Serial No. 669,467. (No model.)

*To all whom it may concern:*

Be it known that I, FREDERICK JOHN SHEWRING, of the city of Toronto, in the county of York and Province of Ontario, Canada, have invented certain new and useful Improvements in Trolley Connections for Canal-Boats; and I hereby declare that the following is a full, clear, and exact description of the same.

The object of this invention is to provide a canal-boat with a trolley connection which will make a practically perfect circuit between the line-wire and feeder for the motor, and at the same time offer no obstruction to the successful navigation of the vessel, and to so construct this trolley connection that it can be cheaply made and easily operated; and the invention consists, essentially, of providing the canal-boat with a rigid trolley-pole reversibly and permanently attached to the boat and having at its upper end a horizontal arm suitably braced, a gravity-balanced trolley embracing in its construction two trolley-wheels journaled in a frame having two depending arms united by a counterbalance, a rod connected to the arms above the counterbalance, and a sliding ring mounted on the rod, to which and to the arm of the trolley-pole is attached a wire or other electric conductor of sufficient slackness and flexibility to permit of the fullest freedom of the movements of the vessel, as hereinafter more fully set forth, and more particularly pointed out in the claims.

In the drawings, Figure 1 represents a view of a canal-boat, poles located along the canal-bank, overhead wires suspended from the poles, the trolley, and a slack-wire connection between the trolley and the trolley-pole connected to the canal-boat. Fig. 2 is an enlarged view of the trolley-pole and slack-wire connection between the trolley and trolley-pole. Fig. 3 is an enlarged view of the trolley, and Fig. 4 is an enlarged view of the swivel.

Like letters of reference refer to like parts throughout the specification and drawings.

A A represent the poles located along the canal-bank. To the upper end of each of the poles is connected an upwardly and outwardly inclined arm $a$, which extends above the top of its respective pole A and outwardly from the pole a sufficient distance to prevent any interference between the pole and the wire.

B B represent horizontal stay-rods, one connected to the top of each pole A and adapted to brace its respective arm $a$.

C represents the circuit or line wire supported by the arms $a$. By reference to the drawings it will be noticed that the top of each of the arms $a$ is slightly curved upward into a practically vertical position to provide for the free movement of the trolley.

D D represent the trolley-wheels, and A' A' the axle of the trolley-wheels. Each of the axles A' is mounted in bearings $e$ formed in the upper members E E of the frame of the trolley. Each member E E consists of two sides at the top united to form an arch over its respective wheel, and permanently attached to the arch is an eye E'. The side of each member E remote from the poles A A is provided with a downward extension $f$, which depends below the wheel and is bent into a substantially horizontal position $f'$, which horizontal part extends inwardly beneath the trolley-wheel and then bent downwardly into a vertical position, the downwardly-extending part $f''$ being vertically below the trolley-wire C. Connected to the lower end of the extensions $f''$ is a counterbalance G, the purpose of which is to maintain the trolley-wheels in an upright position and cause them to remain on the trolley-wire during their travel from end to end of the same, the vertical parts being arranged to equalize the weight of the counterbalance G on the wheels and to prevent the balance coming into contact with the line-wire or meeting with an obstruction from the supporting-arms.

Connected to the parts $f'' f''$ is a horizontal rod E''', and mounted on the rod E'' is a ring E³, which is adapted to slide from end to end.

Connected to the ring E³ and to the counterbalance is a slack wire E⁴. By means of the slack wire E⁴ an electrical circuit is established between the frame and the ring. At the junction of two canals it is necessary to have the trolley-wire sufficiently high to avoid any possibility of contact between the wire and the vessel or parts of the vessel passing below it and to avoid all possibility of obstruction to the masts or other elevated parts. To accomplish this it is necessary to extend the poles at the junction of the canals to a higher elevation or to an elevation which will be above the possible elevation of the masts of the vessel and provide these poles A with arms $a$, braces B, and an elevated trolley-wire C in circuit with the main trolley-wire C at a lower elevation. Mounted upon the elevated trolley-wire C is a trolley H, having a depending rod or wire H', the lower end of which is hook-shaped to engage the eye E' of its respective trolley D. By this construction the trolley D can be carried across the junction of the canals and the circuit of the current maintained to the motor.

I do not confine myself to the use of this trolley connection solely for canal-boats, as I may employ it in connection with any other trolley system where the rigid trolley-pole could not be satisfactorily employed.

I represents a slack wire, one end of which is connected to the ring $E^3$ and the other end of which is connected to the trolley-pole J, fastened to the boat K, the trolley-pole being in circuit with the motor driving the propeller of the vessel. By means of this invention a circuit can be established between the line-wire and the vessel in such a manner as to avoid all difficulties and inconveniences which might arise from the motion of the boat or the changing of direction or irregularities of the canal-bank, and also by means of this invention the use of cross-wires over the canal can be entirely dispensed with and a free channel provided for navigating the vessel.

As the motor and propeller of the canal-boat constitute no part of the present invention, I do not deem it necessary to either illustrate or describe the circuit of the current and the trolley-pole.

The action of the invention is as follows: The trolley is mounted on the line-wire, and a contact is made between the wire and the trolley. The counterbalance maintains the trolley in an upright position during the traverse of the same from end to end of the line-wire. The current circuits through the trolley wheels and frame to the slack wire and then to the trolley-pole, from whence it is conveyed to the motor. By means of the slack-wire connection between the trolley wheel and pole the rolling or rocking motion of the boat cannot be imparted to the trolley-wheel. Thus the liability of the trolley-wheel leaving the wire is avoided. The trolley-pole is preferably connected to the stern of the boat, and the boat in its travel draws the trolley-wheel after it along the line-wire.

The trolley-pole is connected by means of an ordinary swivel $H^5$ to the deck of the boat to admit of the boat changing direction without interfering with the position of the trolley on the line-wire or the connection between the trolley and trolley-pole.

Having thus fully described my invention, what I claim as new, and desire to secure by Letters Patent, is—

1. In a trolley system for canal-boats a trolley consisting of a frame embracing in its construction two vertical members, each member composed of two opposite sides united at their upper ends, a depending arm from each vertical member at one side thereof, bent horizontally below the wheel and then perpendicularly, a counterbalance connected to the lower ends of the depending arms, a rod connected to the arms above the counterbalance, and a sliding ring mounted on the rod to which is adapted to be attached the connection for the trolley-pole, substantially as specified.

2. In a trolley system for canal-boats a trolley consisting of a frame embracing in its construction two vertical members, each member composed of two opposite sides united at their upper ends, a depending arm from each vertical member at one side thereof, bent horizontally below the wheel and then perpendicularly, a counterbalance connected to the lower ends of the depending arms, a rod connected to the arms above the counterbalance having a ring loosely mounted thereon, a swiveled trolley-pole connected to the boat, and a flexible electrical connection between the sliding ring and trolley-pole, substantially as specified.

Toronto, December 14, 1897.

FREDERICK JOHN SHEWRING.

In presence of—
MAUDE A. WESTWOOD,
C. H. RICHES.